United States Patent [19]

Carlson

[11] Patent Number: 4,771,452
[45] Date of Patent: Sep. 13, 1988

[54] TELEPHONE CALL DURATION CONTROL

[76] Inventor: Ronald G. Carlson, 10920 Eastside Dr., Oklahoma City, Okla. 73165

[21] Appl. No.: 28,412

[22] Filed: Mar. 20, 1987

[51] Int. Cl.⁴ .......................................... H04M 15/02
[52] U.S. Cl. .................................... 379/190; 379/140
[58] Field of Search ............... 379/131, 132, 192, 199, 379/200, 190

[56] References Cited
U.S. PATENT DOCUMENTS

| | | | |
|---|---|---|---|
| 3,508,392 | 4/1970 | Temps, Jr. ...................... | 379/131 X |
| 3,590,161 | 6/1971 | Jacobs ................................. | 379/131 |
| 4,161,626 | 7/1979 | Waldo .............................. | 379/131 X |

Primary Examiner—James L. Dwyer
Attorney, Agent, or Firm—Robert K. Rhea

[57] ABSTRACT

A telephone timing device comprising a synchronous motor driven timer energized by a circuit having at least one switch activated by removing the handset from its cradle to start a time cycle. The telephone owner preselects the talking time by setting the timer which disconnects the telephone at a the predetermined time following an audible few seconds warning time to the telephone users. Once started the circuit completes each time period to reset the telephone for a subsequent talking time period. A locked housing containing the timer surrounds the telephone modular wall outlet jack.

3 Claims, 1 Drawing Sheet

TELEPHONE CALL DURATION CONTROL

BACKGROUND OF THE INVENTION

1. Field of the Invention

The present invention relates to a synchronous timer and circuit for limiting the duration of a telephone conversation.

As frequently happens in some households some person or persons unthoughtfully or deliberately make numerous long distance phone calls on a telephone line for which they are not responsible for the charges of such calls. The expense of such calls thus places an unexpected financial burden on the person such telephone number is assigned to. It is highly desirable, therefore, in such situations to be able to at least limit the duration of such long distance calls at the option of a phone owner.

2. Description of the Prior Art

Prior patents generally relate to multifunction or multipurpose telephone service control units which, for example, limit the number of digits a telephone user may dial or automatically dial a preselected number or series of numbers in response to lifting the handset.

This invention provides a circuit and a synchronous timer interposed in wiring operated by a telephone set in which the timer is energized each time the handset is lifted from its cradle.

SUMMARY OF THE INVENTION

A source of electrical energy is connected with a synchronous motor driven timer through an electrical circuit interconnected with a telephone set wiring and actuated by a handset cradle switch. Time duration limit fingers, selectively positioned on the timer dial, interrupt a telephone conversation at preselected intervals and assures the timer being reset to a subsequent phone conversation limiting period. The timer and the majority of its controlling circuit is contained in a home owner's locked housing surrounding the wall mounted modular phone jack.

The principal object is to provide a telephone conversation duration control in which the time periods are easily set by the owner thereof and is not easily by-passed by unauthorized persons and which automatically resets itself for a subsequent conversation period in the event a phone conversation is concluded before the preset time period has expired.

DESCRIPTION OF THE PREFERRED EMBODIMENTS

Figure 4:
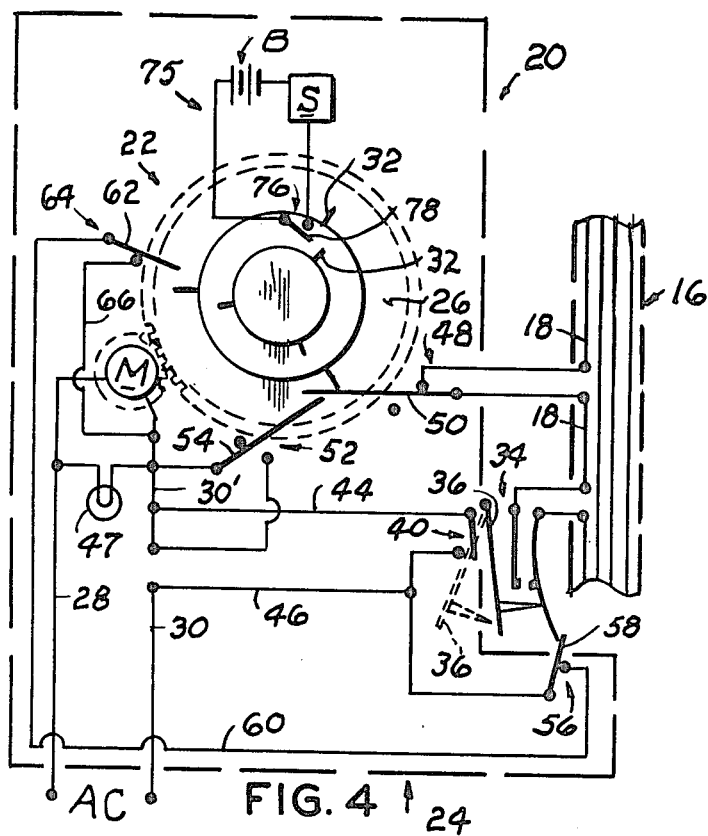
FIG. 4 is a diagram.
Figure 3:
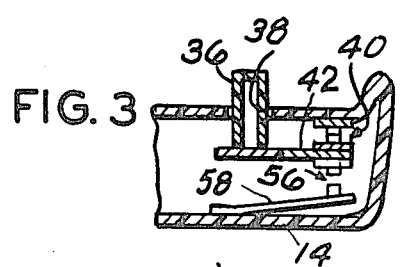
FIG. 3 is a fragmentary vertical cross sectional view, to a further enlarged scale, taken substantially along the line 3—3 of FIG. 2.
Figure 2:
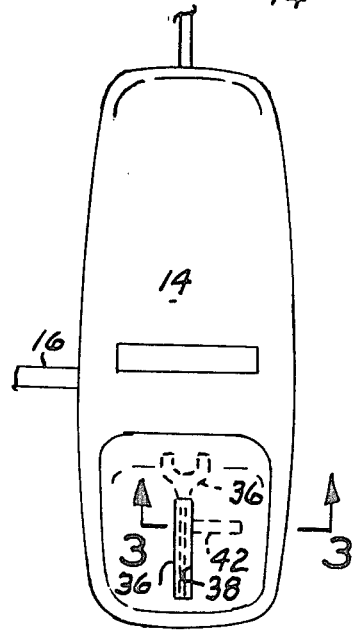
FIG. 2 is a top plan view, to a larger scale, of the handset cradle, per se.
Figure 5:
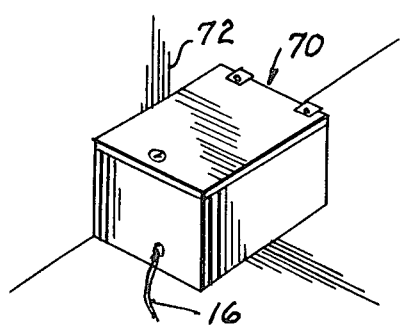
FIG. 5, is a perspective view, to a reduced scale, of the telephone timer/control circuit housing.
Figure 1:
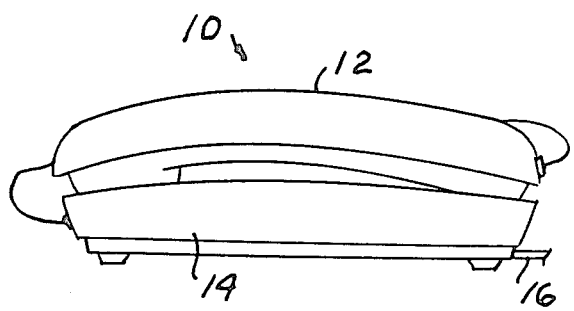
FIG. 1 is a side elevational view of a substantially conventional telephone set.

Like characters of reference designate like parts in those figures of the drawings in which they occur.

In the drawings:

The reference numeral 10 indicates a conventional telephone set including a handset 12 stored by a handset cradle 14. The cradle is connected with an audio source wire by a multicord wire 16. The above telephone description is conventional and is set forth to show the combination with which the invention is used.

A timer control, indicated generally at 20, comprises a substantially conventional timing device 22 and an electrical circuit 24. The timer 22 comprises a disk or dial 26 driven by a synchronous motor M energized by a source of electric energy connected to wires 28 and 30 and controlled by the electrical circuit 24 as will be described.

The timer disk 26 is angularly rotated in a clockwise direction, as viewed in FIG. 4, by the motor M. A plurality of prongs or time elapse fingers 32 are selectively positioned on the disk in circumferentially spaced relation to indicate a selected period of time or time elapse between any two adjacent time fingers 32 for the purposes presently apparent.

Referring again to the telephone handset cradle 14, the cradle is conventional and provided with a normally open switch 34 interposed in its telephone mounting wire 18 which is biased open by a dielectric switch operating prong 36, projecting upwardly through a cradle slot 38, by the mass of the handset 12 when placed in the cradle. Lifting the handset 12 releases the prongs 36 to close the cradle switch 34 and energize the telephone set.

A normally open timer motor switch 40 has its armature 42 connected with the cradle switch prong 36 and movable therewith to close the timer switch 40 by the lifting of the handset 12. The timer motor source wire 30 is divided and the wires 30 and 30' are connected in series with the timer motor switch terminal 40 and its contact by wires 44 and 46 so that when the handset is lifted the motor M and a signal lamp 47 are energized. A second normally closed telephone interrupting switch 48 is mounted adjacent the timer disk 26 with its armature 50 disposed in the path of travel of its fingers 32. The telephone mounting wire 18 is broken or divided with its cut ends respectively connected with the switch armature 50 and its contact in a manner such that when one of the timer fingers 32 contacts armature 50 the switch 48 is opened thus deenergizing the telephone set and interrupting any audible signal message.

To insure that the timer continues angular rotation of its disk 26 a third switch 52 has its armature 54 mounted adjacent the disk 26 and in the path of travel of the switch armature 50 so that as a finger 32 opens the switch 48 it simultaneously closes the switch 52 having its armature and contact respectively connected with the source wires 30' and 30 thus maintaining the motor M energized until the finger 32 has been angularly rotated beyond its contact with the armature 50 thus permitting the switch 48 to be restored (closed) and the switch 52 opened interrupting current to the motor M. (Assuming that the handset 12 has been replaced on its cradle thus opening the motor first switch 40.) In the event a caller uses the handset for a conversation of duration less than the time elapse between two adjacent timer fingers 32 a normally open fourth switch 56 is mounted in the cradle 14 with its armature 58 connected with the motor source wire 30 through the wire 46 so that when the handset 12 is cradled the armature 58 is closed with its contact connected in turn by a wire 60 with the armature 62 of a fifth normally closed switch 64 mounted adjacent the timer disk 26 with its contact connected with the motor source wire 30' by a wire 66.

The handset closing of the fourth switch 56 thus energizes the motor through the normally closed switch 64 until opened by a timer finger contacting the armature 62 to deenergize the motor M at the conclusion of the predetermined time lapse between any two of the fingers 32.

The device 20 is preferably contained by a lock secured housing 70 surrounding the modular phone outlet connection, not shown, adjacent a dwelling wall 72 to prevent unauthorized use of a telephone set not controlled by the time control 20.

The control further includes a battery powered signal circuit 75 warning the telephone user that the selected time period is about to end. The signal circuit 75 comprises a dry cell battery B connected in series with an audible signal device S, such as a buzzer through a signal switch 76 normally open having its armature 78 mounted on the dial in a manner to be closed by one of the disk fingers 32. The switch is positioned or the switch closing fingers 32 positioned such that the switch 76 is closed a predetermined number of seconds prior to the opening of the phone conversation switch 48. This presignal is for the purpose of allowing the phone users to quickly terminate their conversation prior to the end of the preselected time period.

Obviously the invention is susceptible to changes or alterations without defeating its practicability. Therefore, I do not wish to be confined to the preferred embodiment shown in the drawings and described herein.

I claim:

1. A motor driven timing control for a telephone set including a handset and a cradle therefor, and at least two telephone wires, the cradle having a first telephone circuit closing switch in series with at least one of said telephone wires and including a switch arm biased to close the telephone circuit closing switch by manually lifting the handset off of the cradle and having a first motor energizing switch, said first switch closed upon off hook of the handset, further comprising:
   a synchronous motor driven timer having an angularly rotating dial and having a plurality of radially projecting fingers disposed in circumferentially spaced relation around its periphery;
   timer motor energizing wires connecting a source of electrical energy with said motor;
   a normally open circuit means interposed in one motor wire including said first switch being in series and driving said motor when closed, a second telephone circuit closing switch in series with one of said telephone wires normally closed and opened by said projecting fingers after a predetermined time period following said first switch being closed;
   thereby limiting the length of time in which the handset can be off hook and maintain a closed telephone circuit for said predetermined time period.

2. The telephone timing control according to claim 1 in which said normally open circuit means further includes:
   a third switch connected in parallel with said first switch for maintaining said timer motor energized through said predetermined time period each time said first switch is closed.

3. The telephone timing control according to claim 2 and further including:
   audible signal means including an audible signal circuit actuated by another one said finger at a second predetermined time.

* * * * *